Oct. 29, 1935.                J. ROBINOVITZ                2,019,319
                               MIXING FAUCET
                             Filed May 17, 1933
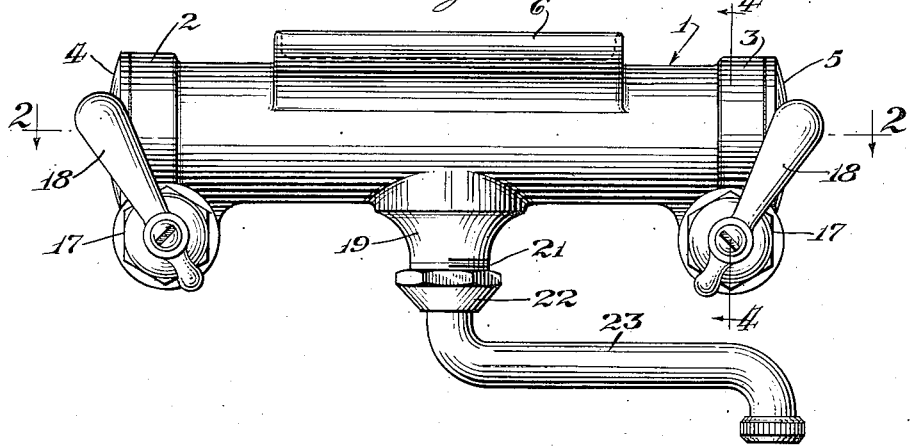
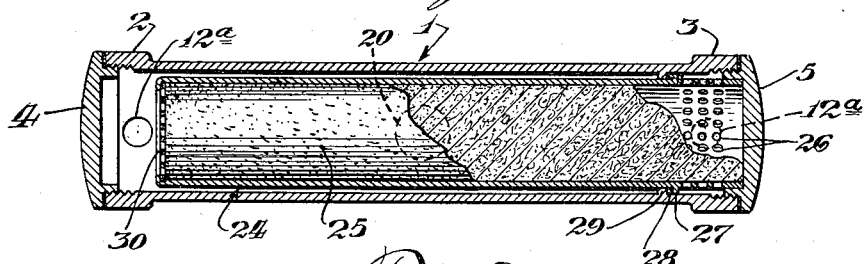
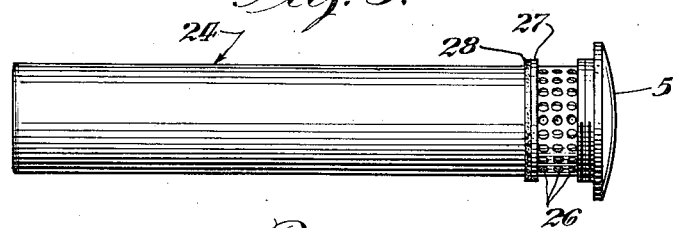
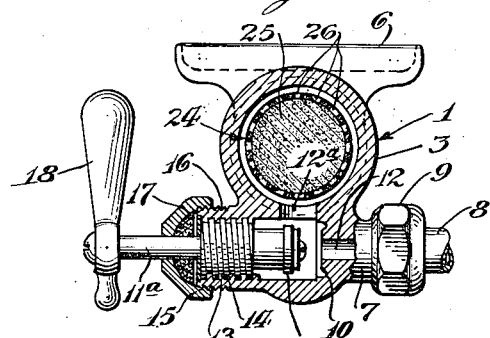
Inventor:
Jack Robinovitz
By Parkinson & Lane
  Attorneys Patented Oct. 29, 1935

2,019,319

UNITED STATES PATENT OFFICE 2,019,319

MIXING FAUCET

Jack Robinovitz, Chicago, Ill., assignor to Filtro Faucet Manufacturing Co., Chicago, Ill., a corporation of Illinois Application May 17, 1933, Serial No. 671,429

7 Claims. (Cl. 210—86)

The present invention relates to mixing faucets, and more in particular to a novel construction of such a faucet provided with a filter, and in the construction of the filter.

Among the objects of the present invention is to provide a novel construction of mixing faucet provided with a removable filtering cartridge for fitting the water passing therethrough.

A further object is the provision of a novel filter adapted to be readily inserted, removed or replaced in the faucet. In the present embodiment, the filter is mounted upon or carried by an end cap or closure for the faucet chamber or casing, is automatically located or positioned in predetermined, operative position when the closure is screwed into the chamber, and is removable with the closure.

Another object is the provision of a novel cartridge provided with filtering material such as charcoal, carbon, and/or other carbonaceous material or the like suitable for the purpose of filtering the liquid passing therethrough.

Still another object of the invention is the provision of a member adapted to filter the liquid passing into the mixing chamber of a faucet, and so constructed and arranged that all the liquid which is to be filtered must pass through said member.

A further object of the invention is to provide a filter for a mixing faucet for filtering the cold water passing therethrough, and so arranged that the discharge end of the filter is adapted to receive a portion of the flow from the hot water faucet whereby such hot water flows in the filter in a direction opposite to the path taken by the cold water and thereby flushes the filtering material. This flushing operation prolongs the life of the filter and prevents a packing of the filtering material and impedance to the normal flow of liquid in the one direction. Although the drawing discloses the filter as connected to and filtering only the cold water, it is to be understood that either the cold or hot water may be filtered should the occasion arise. For that purpose, the mixing chamber is provided with interchangeable closures or end caps so that the filter cartridge may be inserted from either side. Also, it will be evident that the cartridge may be made smaller, or the mixing chamber be made larger so that a filter may be provided for both the cold and hot water. Such construction may be desirable for hospital use or other purposes.

Further objects are to provide a construction of maximum simplicity, efficiency and ease of assembly, operation and maintenance, and such further objects, advantages and capabilities as will later more fully appear and as are inherently possessed thereby.

The invention further resides in the combination, construction and arrangement of parts illustrated in the accompanying drawing, and while there is shown therein a preferred embodiment, it is to be understood that the same is susceptible of modification and change and comprehends other details and constructions, without departing from the spirit of the invention.

In the drawing:

Fig. 1 is a view in side elevation of the mixing faucet.

Fig. 2 is a view in horizontal cross section taken through the casing in a plane represented by the line 2—2 of Fig. 1, but omitting the details of the valves, handles and discharge nozzle, and showing part of the filtering material in side elevation and part completely removed to show the inlet openings in the filtering cartridge.

Fig. 3 is a view in side elevation of the filter cartridge and end closure for the mixing chamber.

Fig. 4 is a view in vertical cross section taken in a plane represented by the line 4—4 of Fig. 1.

Referring more particularly to the disclosure in the drawing, the novel construction of mixing faucet comprises a casing or casting 1 adapted to form a mixing chamber, the ends 2 and 3 thereof being enlarged and interiorly threaded to receive threaded end caps or closures 4 and 5. A soap dish or container 6 is formed on the upper side of the casting 1, while at the opposite ends on the under side of the casting are provided rearwardly extending nipples 7 each adapted to be connected to the inlet end of a pipe 8 by means of a coupling 9. One of the pipes 8 is normally adapted to carry cold water while the pipe at the opposite end of the mixing faucet is adapted to carry hot water.

Each nipple 7 is provided with a valve seat 10 adapted to receive a valve 11 for closing the inlet 12 and thereby prevent the liquid from passing from the inlet through the port 12ª leading to the mixing chamber. This valve is mounted upon a valve stem 11ª having an enlarged threaded portion 13 adapted to be received in complementary threads 14 formed in the casting 1 and permitting longitudinal movement of the valve member 11 whereby to seat or unseat the same. The threaded cap or nut 15 seats on an exteriorly threaded extension 16 which houses the valve, the threaded cap centering and forming a bearing for the valve stem and being provided with a packing 17. The handle 18 is adapted to rotate the valve stem and seat or unseat the valve member. As the valve construction for both the cold and hot water are similar in construction, but one of them has been shown in detail.

The casting 1 is provided or formed with a downwardly extending portion 19 having a discharge outlet 20 for the discharge of the liquid from the mixing chamber. This extension is exteriorly threaded at 21 to receive a coupling 22 carrying a nozzle 23. The mounting of the nozzle is such as to permit universal rotation thereof.

In Figs. 2 and 3 is disclosed the novel filter construction. This filter comprises a cylindrical cartridge or housing 24 adapted to contain filtering material 25 such as carbon, charcoal and/or other carbonaceous or filtering material suitable for the purpose. This cartridge is shown as having its one end suitably mounted in the closure or end cap 5 and adapted to be removed or assembled therewith. Adjacent the end mounted in the closure or cap, the side wall of the cartridge is perforated as at 26 to receive the liquid discharged from the inlet 12 of the pipe, which in the illustrated embodiment is the cold water pipe.

In order that all of the flow from this cold water pipe passes through the perforations 26 and into the interior of the cartridge 24, the wall of the cartridge is crimped outwardly to provide an annular bead or flange 27 adapted to fit conformably within the casting 1. Adjacent the bead or flange is provided a washer 28 encompassing the cartridge and adapted to seat against an annular shoulder or rib 29 formed on the interior of the casting. As the end cap or closure 5 carrying the cartridge 24, is screwed into the casting or mixing chamber, the washer will contact the inner periphery of the chamber and the bead 27 will force this washer 28 against the annular shoulder 29 and form a liquid tight seal, thereby preventing any by-passing of the liquid around the cartridge without going therethrough. The opposite or discharge end of the cartridge is provided with a perforated disc 30 functioning as a filter screen and end wall for retaining the filtering material 25 within the cartridge. As disclosed in Fig. 2, this perforated disc is adjacent the hot water inlet 12 and a portion of the flow of the hot water will pass through this disc and into the cartridge in a direction opposite to the flow of the cold water therethrough, and will thus flush the filtering material and prevent a packing thereof so as to eliminate any impedance to the normal flow and filtration of the liquid. A thorough and complete flushing of the filtering material may be accomplished by loosening the closure or end cap 5 to permit the hot water which flows through the filter to escape at this end of the filter unit. If it is desired that all of the hot water pass therethrough, this may be accomplished by closing off the outlet 23 as by means of a closure or placing the finger thereover, so that all the water from the hot water inlet must pass through the filter unit. This flushing operation prolongs the life and usefulness of the filter. If desired, the filtering material may be chemically or otherwise treated.

Although the drawing discloses the filter as merely filtering the cold water passing into the mixing chamber, it is to be understood that either or both the cold and the hot water may be filtered if so desired. The closures or end caps 4 and 5 are interchangeable and are each adapted to receive a filter.

From the above disclosure and description, it will be readily apparent that the invention comprehends a novel construction of mixing chamber and filtering device therefor which is simple and efficient in operation and which can be cheaply constructed.

Having thus disclosed the invention, I claim:

1. In a mixing faucet provided with a unitary casing forming a mixing chamber, liquid inlets and control valves therefor in the opposite ends of said chamber and an outlet intermediate said inlets, and a renewable and readily replaceable unit adapted to be inserted longitudinally in said chamber and provided with filtering material, said unit being spaced from the side wall of the mixing chamber and provided with openings at an end thereof and adjacent one of said inlets and communicating with the interior of said unit, complementary closure members on the side wall of the mixing chamber and unit for preventing passage of unfiltered liquid from said last mentioned inlet to the outlet and additional openings in the opposite end of said unit adjacent the other inlet and communicating with the space between the filter and chamber and the faucet outlet for discharge of the filtered liquid.

2. In a unitary mixing faucet provided with a mixing chamber, liquid inlets and control valves in the opposite ends of said chamber and a liquid outlet intermediate said ends, a removable closure for one end of said chamber, a filtering body carried by said closure, the side walls of said body being perforated only at one end thereof for passage of the liquid from one of said inlets to the interior of the body, a perforated end wall at the opposite end of the chamber for the discharge of the filtered liquid, and abutting annular flanges in said chamber and on said body forming a closure therebetween for preventing the passage of unfiltered liquid from said inlet.

3. In a mixing faucet provided with a mixing chamber and liquid inlets at the opposite ends thereof, a liquid outlet intermediate said inlets, a detachable cartridge insertable in said chamber and spaced from the inner wall thereof, said cartridge being provided with filtering material and communicating with one of said inlets for filtering the liquid passing therefrom, and abutting surfaces on said chamber and cartridge forming a closure therebetween for preventing the passage of unfiltered liquid from said one inlet to the outlet, the discharge end of said cartridge being adjacent the other of said inlets whereby liquid flowing from said other inlet will enter said cartridge and pass therethrough in a reverse direction and thereby flush said filtering material.

4. In a mixing faucet provided with a mixing chamber and a hot and cold water inlet and an outlet, a member provided with filtering material and adapted to be inserted in said chamber in spaced relation with the side wall thereof for filtering the cold water, and closure means for preventing the cold water passing to the outlet except through the filtering member, said member being imperforate except for openings at one end thereof communicating with said cold water inlet and the interior of said member and openings adjacent the hot water inlet whereby the discharged hot water may pass into and through said filtering member in a direction opposite to that of the cold water and thereby flush the filtering material therein.

5. In a unitary mixing faucet formed with a mixing chamber and liquid inlets adjacent the opposite ends thereof and control valves for said inlets, a liquid outlet from said chamber, a detachable closure for one end of said chamber, a filter cartridge mounted on said closure and removable therewith as a unit and communicating with one of said inlets for filtering the liquid passing therefrom, said cartridge being spaced from the inner wall of said chamber to permit a discharge of the filtered liquid at a point intermediate the opposite ends of said cartridge, and complementary abutting surfaces on said cartridge and chamber for preventing the passage of unfiltered liquid from said one inlet to the outlet.

6. In a mixing faucet, a mixing chamber therefor having an inlet adjacent each of the opposite ends thereof and an outlet intermediate said ends, a detachable closure for one of the ends of the chamber, a filter cartridge removably mounted in said chamber, an inlet for said cartridge adjacent one of said inlets to said chamber for filtering the liquid passing therethrough, means for confining the liquid to be filtered whereby such liquid must pass through the cartridge, and an outlet for said cartridge at the opposite end and adjacent the other inlet to said mixing chamber, whereby liquid from said other inlet may pass into and through said cartridge in a direction opposite to that of the liquid to be filtered whereby to flush the filtering material.

7. In a mixing faucet, a mixing chamber therefor comprising an elongated receptacle having an inlet and a control valve therefor adjacent each of the opposite ends thereof, an outlet for said faucet intermediate said inlets, a detachable closure member for an end of the receptacle, a filter readily insertable in and removable from said receptacle, said filter having an inlet adjacent one end and an outlet at the other end and having its body spaced from the interior of the chamber to permit a discharge of the filtered liquid from said filter and through said outlet, and means for confining the liquid to be filtered whereby such liquid must pass through the filter prior to being discharged.

JACK ROBINOVITZ.